United States Patent
Park et al.

(10) Patent No.: US 9,921,054 B2
(45) Date of Patent: Mar. 20, 2018

(54) SHOOTING METHOD FOR THREE DIMENSIONAL MODELING AND ELECTRONIC DEVICE SUPPORTING THE SAME

(71) Applicant: Samsung Electronics Co., Ltd., Suwon-si, Gyeonggi-do (KR)

(72) Inventors: Jonghyun Park, Seoul (KR); Jungwan Ko, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 14/287,781

(22) Filed: May 27, 2014

(65) Prior Publication Data

US 2014/0354784 A1 Dec. 4, 2014

(30) Foreign Application Priority Data

Jun. 4, 2013 (KR) ........................ 10-2013-0063774

(51) Int. Cl.
| | |
|---|---|
| *G01B 11/00* | (2006.01) |
| *G01B 11/24* | (2006.01) |
| *G01C 11/06* | (2006.01) |
| *G06T 7/55* | (2017.01) |

(52) U.S. Cl.
CPC .............. *G01B 11/24* (2013.01); *G01C 11/06* (2013.01); *G06T 7/55* (2017.01); *G01B 2210/54* (2013.01)

(58) Field of Classification Search
CPC ....... G01B 11/24; G01B 2210/54; G06T 7/55; G01C 11/06

USPC ........................................................ 348/50
See application file for complete search history.

(56) References Cited

U.S. PATENT DOCUMENTS

| | | | | |
|---|---|---|---|---|
| 4,794,417 | A * | 12/1988 | Sekiguchi | H04N 5/23212 348/345 |
| 6,253,160 | B1 * | 6/2001 | Hanseder | E02F 3/435 342/357.27 |
| 2003/0202089 | A1 * | 10/2003 | Alhadef | G01C 11/06 348/42 |
| 2004/0189813 | A1 * | 9/2004 | Tanaka | G06F 17/30265 348/207.99 |
| 2006/0119864 | A1 * | 6/2006 | Lindner | G01B 11/245 356/606 |
| 2011/0304750 | A1 * | 12/2011 | Lee | H04N 5/23296 348/240.99 |
| 2012/0121135 | A1 * | 5/2012 | Kotake | G01S 5/163 382/103 |
| 2012/0162220 | A1 * | 6/2012 | Sakurai | G06T 17/00 345/419 |

(Continued)

FOREIGN PATENT DOCUMENTS

JP 2000253393 A * 9/2000 ............. G01B 11/00

*Primary Examiner* — Jeffery Williams
(74) *Attorney, Agent, or Firm* — Jefferson IP Law, LLP

(57) ABSTRACT

A shooting method for three-dimensional modeling and an electronic device supporting the same are provided. The electronic device includes a sensor unit for sensing position information and a camera module for image capture. The shooting method for three-dimensional modeling includes performing sensor calibration, obtaining position information used for three dimensional modeling using the sensor unit, capturing multiple images of a target object used for three dimensional modeling according to the obtained position information, and storing the position information as metadata of each captured image.

20 Claims, 12 Drawing Sheets

(56) References Cited

U.S. PATENT DOCUMENTS

2013/0258117 A1* 10/2013 Penov .................. G06K 9/6202
                                                      348/207.1
2013/0329014 A1* 12/2013 Obata ............... H04M 1/72522
                                                       348/46
2014/0063220 A1*  3/2014 Taylor .................. A61F 5/0106
                                                        348/77

* cited by examiner

SHOOTING METHOD FOR THREE DIMENSIONAL MODELING AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Jun. 4, 2013 in the Korean Intellectual Property Office and assigned Serial number 10-2013-0063774, the entire disclosure of which is hereby incorporated by reference.

TECHNICAL FIELD

The present disclosure relates to a camera shooting method for three dimensional modeling and an electronic device supporting the same.

BACKGROUND

In general, 3 Dimensional (3D) images in a virtual space are created through 3D modeling based on mathematical models.

To create a 3D image through 3D modeling, shape, appearance (e.g., color), and position information of a real object are first obtained.

Information for composing a 3D image may be obtained generally in two ways. First, multiple photographs of a physical object (target object) are taken by multiple optical instruments (such as cameras or electronic devices having a camera module) installed at fixed sites around the target object. Second, multiple photographs of a target object are taken in sequence by a single optical instrument being rotated around the target object, and information on the position, shape and appearance is obtained from the multiple photographs. Here, the information on the position between an optical instrument and a target object is related to the distance, height, and angle of the optical instrument or the target object.

Use of multiple optical instruments enables composition of a precise 3D image because information on the position between the optical instrument and the target object can be known in advance. In the case of using one optical instrument, a 3D image of the target object is composed by estimating information on the position between the optical instrument and the target object mainly using information on planes with a static or fixed background.

Use of multiple optical instruments to obtain position information of a target object may cause a problem in terms of space and costs.

In the case of using one optical instrument to obtain position information of a target object, it may be difficult to compute relative values in position information obtained by the optical instrument depending upon conditions in the background of the target object. When a complex background (e.g., a three dimensional background that is not flat) is used, the obtained 3D image tends to be distorted. To avoid such a problem, a large amount of position information is collected by taking many photographs. This may increase the amount of information to be sent to the processor and lengthen processing time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a shooting method for effective three dimensional modeling and an electronic device supporting the same.

In accordance with an aspect of the present disclosure, a shooting method for three-dimensional modeling is provided. In an electronic device having a sensor unit for sensing position information and a camera module for image capture, the shooting method includes performing sensor calibration, obtaining position information used for three dimensional modeling using the sensor unit, capturing multiple images of a target object used for three dimensional modeling according to the obtained position information, and storing the position information as metadata of each captured image.

In accordance with another aspect of the present disclosure, an electronic device supporting a shooting method for three-dimensional modeling is provided. The electronic device includes a sensor unit configured to sense a current position of the electronic device, a camera module to capture images used for three dimensional modeling, a control unit configured to control a process of performing sensor calibration, to obtain position information used for three dimensional modeling using the sensor unit, to capture multiple images of a target object used for three dimensional modeling according to the obtained position information, and to store the position information as metadata of each captured image, and a touchscreen configured to display the position information and captured images.

In a feature of the present disclosure, when an image for 3 Dimensional (3D) modeling is created, position information obtained using multiple sensors of the electronic device is included as metadata. Hence, it is possible to create an elaborate 3D image at low cost.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
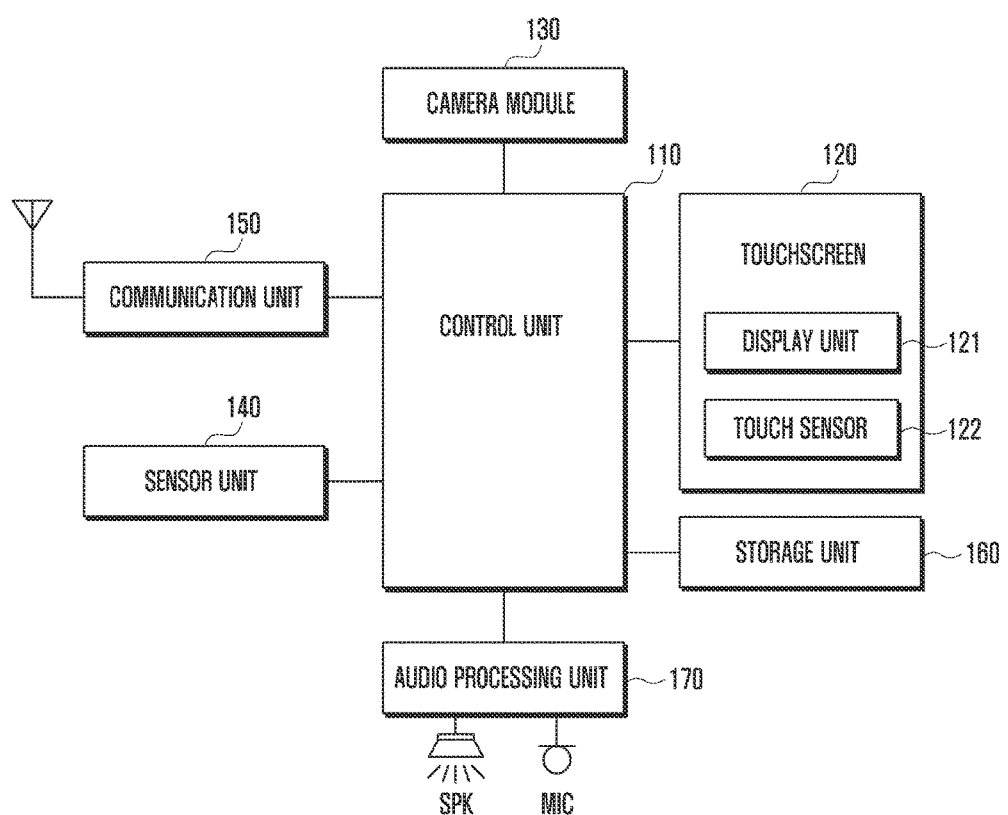
FIG. 1 is a block diagram of an electronic device according to an embodiment of the present disclosure.

FIG. 1 is a block diagram of an electronic device according to an embodiment of the present disclosure.

Referring to FIG. 1, the electronic device may include a control unit 110, a touchscreen 120, a camera module 130, a sensor unit 140, a communication unit 150, a storage unit 160, and an audio processing unit 170.

The control unit 110 controls operations implementing a shooting method for 3 Dimensional (3D) modeling in the electronic device. For 3D modeling, the control unit 110 obtains position information of the electronic device and position information between the electronic device and target object through the sensor unit 140 and outputs the obtained information on the display unit 121. The control unit 110 may obtain image information for 3D modeling from the camera module 130 and display the image information on the display unit 121. The control unit 110 may store position information obtained from the sensor unit 140 and image information obtained from the camera module 130 in the storage unit 160. The control unit 110 may send position information obtained from the sensor unit 140 and image information obtained from the camera module 130 to an external server through the communication unit 150. The external server may generate 3D image data using image information and position information received from the electronic device through 3D modeling and then send the 3D image data to the electronic device. The control unit 110 may receive 3D image data from the external server through the communication unit 150 and output the 3D image data on the display unit 121.

The control unit 110 may separately store position information obtained from the sensor unit 140 and image information obtained from the camera module 130 in the storage unit 160. The control unit 110 may also store the position information together with the image information as an image file in the storage unit 160 so that the position information is included as metadata of the image information.

The touchscreen 120 is an input and output means for input and display and may include a display unit 121 and a touch sensor 122. The touchscreen 120 may display various screens used for operation of the electronic device (such as a content playback screen, call handling screen, messenger screen, gaming screen, and gallery screen) through the display unit 121. In particular, for 3D modeling, the touchscreen 120 may display position information obtained from the sensor unit 140 and image information obtained from the camera module 130 on the display unit 121. When a user touch event is detected by the touch sensor 122 during screen display on the display unit 121, the touchscreen 120 may send an input signal corresponding to the touch event to the control unit 110, which may then recognize a touch event and perform a control operation according to the touch event.

The display unit 121 may output or display information processed by the electronic device. For example, when the electronic device is in a call processing mode, the display unit 121 may display a User Interface (UI) or Graphical User Interface (GUI) related to a call. When the electronic device is in a shooting mode for 3D modeling, the display unit 121 may display a UI or GUI related to image information and position information. The display unit 121 may operate in a landscape mode or portrait mode and may switch between the landscape mode and portrait mode according to rotation or placement of the electronic device.

The display unit 121 may be realized using one or more of display techniques based on Liquid Crystal Display (LCD), Thin Film transistor LCD (TFT-LCD), Light Emitting diodes (LED), Organic LED (OLED), Active Matrix OLEDs (AMOLED), flexible display, bendable display, 3D display, and any similar and/or suitable display technique. The display unit 130 may also use a transparent display technology so as to be seen from the outside.

The touch sensor 122 may be placed on the display unit 121 and may sense a touch event generated by the user on the surface of the touchscreen 120 (for example, a long press touch gesture, short press touch gesture, single-touch gesture, multi-touch gesture, and touch and move gesture such as drag). Upon sensing of a touch event on the touchscreen 120, the touch sensor 122 may identify coordinates of the touch point and send the coordinate information to the control unit 110. The control unit 110 may perform a function corresponding to the touch point in response to a signal from the touch sensor 122. The touch sensor 122 may be configured to convert a pressure change or capacity change at a portion of the display unit 121 into an electrical signal. The touch sensor 122 may be configured to sense not only a touch point and touch area but also a touch pressure according to applied touch techniques. When a touch input is sensed by the touch sensor 122, a corresponding signal may be sent to a touch controller (not shown). The touch controller may process the signal and send the processing result to the control unit 110. Hence, the control unit 110 may identify the touched portion on the touchscreen 120.

The camera module 130 is configured to capture an image of a target object, and may include a lens and a Charge Coupled Device (CCD) or Complementary Metal Oxide Semiconductor (CMOS) image sensor. In particular, the camera module 130 may capture an image of a target object and generate corresponding image information. In response to a user selection signal, the control unit 110 may store the image information and associated metadata as an image file in the storage unit 160.

The sensor unit 140 may include a gyro sensor for sensing movement direction and acceleration of the electronic device, a geomagnetic sensor for sensing the azimuth using earth's magnetic fields to identify the orientation of the electronic device, an acceleration sensor for sensing spatial movement of the electronic device, a proximity sensor for measuring the distance between the electronic device and an object, and any similar and/or suitable sensor. The sensor unit 140 may obtain position information of a target object for 3D modeling by use of at least one of the gyro sensor, geomagnetic sensor, acceleration sensor, and proximity sensor. The obtained position information may be used as metadata of image information under control of the control unit 110.

The communication unit 150 may establish a communication channel for a voice call, video call and data call under control of the control unit 110. That is, the communication unit 150 may establish a voice call channel, video call channel or a data communication channel with a service operator network. To this end, the communication unit 150 may include a radio frequency transmitter for upconverting the frequency of a signal to be transmitted and amplifying the signal, and a radio frequency receiver for low-noise amplifying a received signal and downconverting the frequency of the received signal. Here, the data communication channel may be used for a video call service, an instant messaging service, a chat service, and a data transmission and download service. In particular, the communication unit 150 may send 3D modeling information to an external server and receive a 3D image as a result of 3D modeling from the external server under control of the control unit 110.

The storage unit 160 may store programs used to perform overall operation and specific functions of the electronic device, and data generated during program execution. For example, the storage unit 160 may store an Operating System (OS) for booting the electronic device, application programs realizing specific functions of the electronic device, and data generated in the course of operating the electronic device. The storage unit 160 may include a Read Only Memory (ROM), a Random Access Memory (RAM), and the like. In particular, the storage unit 160 may store image information of a target object obtained by the camera module 130 and position information of the target object obtained by the sensor unit 140 under control of the control unit 110.

The audio processing unit 170 may output various audio data generated during operation of the electronic device, audio data generated by playback of an audio file stored in the storage unit 160, and audio data received from an external entity. The audio processing unit 170 may also support collection of audio data. To this end, the audio processing unit 170 may include a speaker SPK and a microphone MIC. In particular, the audio processing unit 170 may output sound effects or sound notifications configured for acquisition of position information for 3D modeling. Output of a sound effect or sound notification may be skipped according to user or designer settings.

Figure 2:
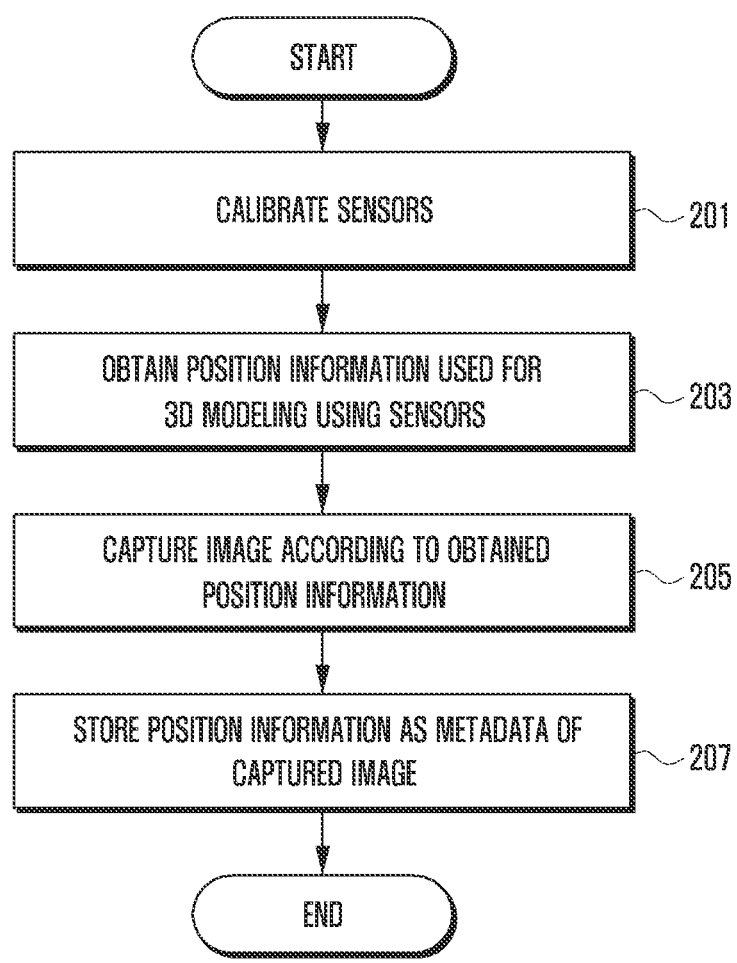
FIG. 2 is a flowchart of a shooting method for 3 Dimensional (3D) modeling according to an embodiment of the present disclosure.

FIG. 2 is a flowchart of a shooting method for 3D modeling according to an embodiment of the present disclosure.

Referring to FIG. 2, for 3D modeling, at operation 201, the electronic device calibrates sensors, such as a gyro sensor, geomagnetic sensor, acceleration sensor and proximity sensor, etc. included in the sensor unit 140.

The sensor unit 140 may measure the height of the electronic device as part of position information first. For example, when the user raises the electronic device from a reference plane to a desired height, the acceleration sensor may determine the height of the electronic device from the reference plane on the basis of the sensed acceleration and the time taken.

Alternatively, when the electronic device is fixed at a desired height, the proximity sensor may measure the distance between the electronic device and the ground.

At operation 203, the electronic device obtains position information for 3D modeling using the sensor unit 140. Here, the position information may include information regarding the height of the electronic device, the distance between the electronic device and target object, the tilt of the electronic device, and the angle between the electronic device and target object relative to the start position of image capture. The electronic device may sense the tilt thereof using the gyro sensor, and may determine the distance between the electronic device and target object on the basis of the tilt and height thereof.

Image information and position information of the target object is used for 3D modeling. The number of images of the target object used for 3D modeling may be determined in advance by an external server or the user. Here, the angle between the electronic device and target object relative to the start position of image capture may be determined according to the number of target object images used for 3D modeling. For example, when front, rear, left and right images of a target object are used for 3D modeling, as the number of target object images used for 3D modeling is four, the electronic device is operated to measure the angle at a step of 90 degrees.

As the sensor unit 140 may sense the angle between the electronic device and target object, a minimum number of target object images may be captured for 3D modeling without duplicate or unnecessary images.

At operation 205, the electronic device generates an image using the camera module 130 according to the position information obtained by the sensor unit 140. Here, the electronic device outputs position information obtained through the sensor unit 140 on the display unit 121 in real time. The electronic device may identify position information used for 3D modeling using information obtained in real-time through the sensor unit 140 and generate image information accordingly. Position information obtained when the image information is generated may be stored separately or as metadata of the image information in the storage unit 160. The electronic device may output position information obtained through the sensor unit 140 to the display unit 121 in real time, and may also output the same as a sound effect or notification through the speaker SPK of the audio processing unit 170 in real time.

When position information obtained through the sensor unit 140 is output in real time on the display unit 121, the display unit 121 may display a UI or GUI related to image information and position information.

At operation 207, the electronic device stores the position information obtained when the image information is generated as metadata of the image information. The electronic device may also separately store the image information and the position information obtained when the image information is generated. Here, metadata is structured data related to an image. For example, when a photograph is taken, a digital camera may store information regarding the camera itself, the date and time photographed, exposure, flash utilization, resolution, photo size, and other similar and/or suitable information together with the image data. In one embodiment, metadata may be stored in the Exchangeable image file format (Exif).

Figure 3:
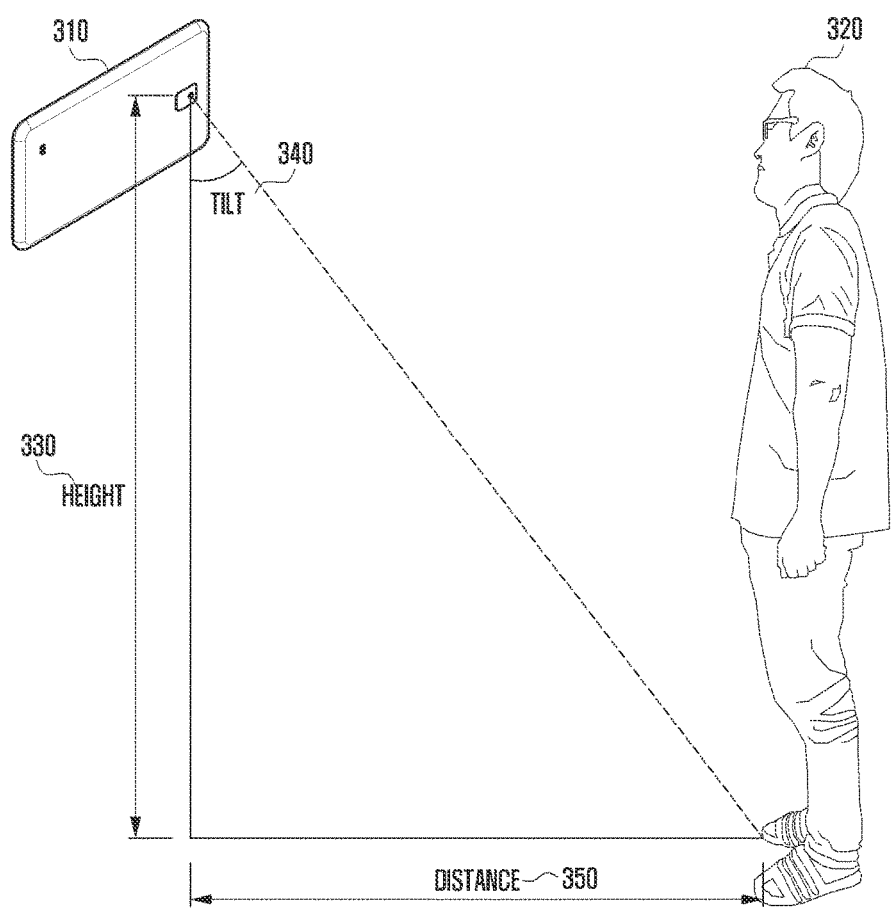
FIG. 3 illustrates acquisition of position information for 3D modeling according to an embodiment of the present disclosure.

FIG. 3 illustrates acquisition of position information for 3D modeling according to an embodiment of the present disclosure.

Referring to FIG. 3, a scheme is illustrated to obtain information regarding the height 330 of the electronic device 310, the distance 350 between the electronic device 310 and target object 320, and the tilt 340 of the electronic device 310 as part of position information for 3D modeling.

First, the electronic device 310 obtains information on the height 330 set by the user through sensor calibration.

The tilt 340 of the electronic device 310 may be sensed through the gyro sensor, and the distance 350 between the electronic device 310 and target object 320 may be determined on the basis of the tilt 340 and height 330 of the electronic device 310.

For example, when the user leans the electronic device 310 toward the target object 320, the electronic device 310 may compute the distance 350 between the electronic device 310 and target object 320 on the basis of the height 330 thereof (already measured) using Equation 1.

$$\text{height} * \tan(\text{tilt}) = \text{distance} \quad \text{Equation 1}$$

Figure 4A:
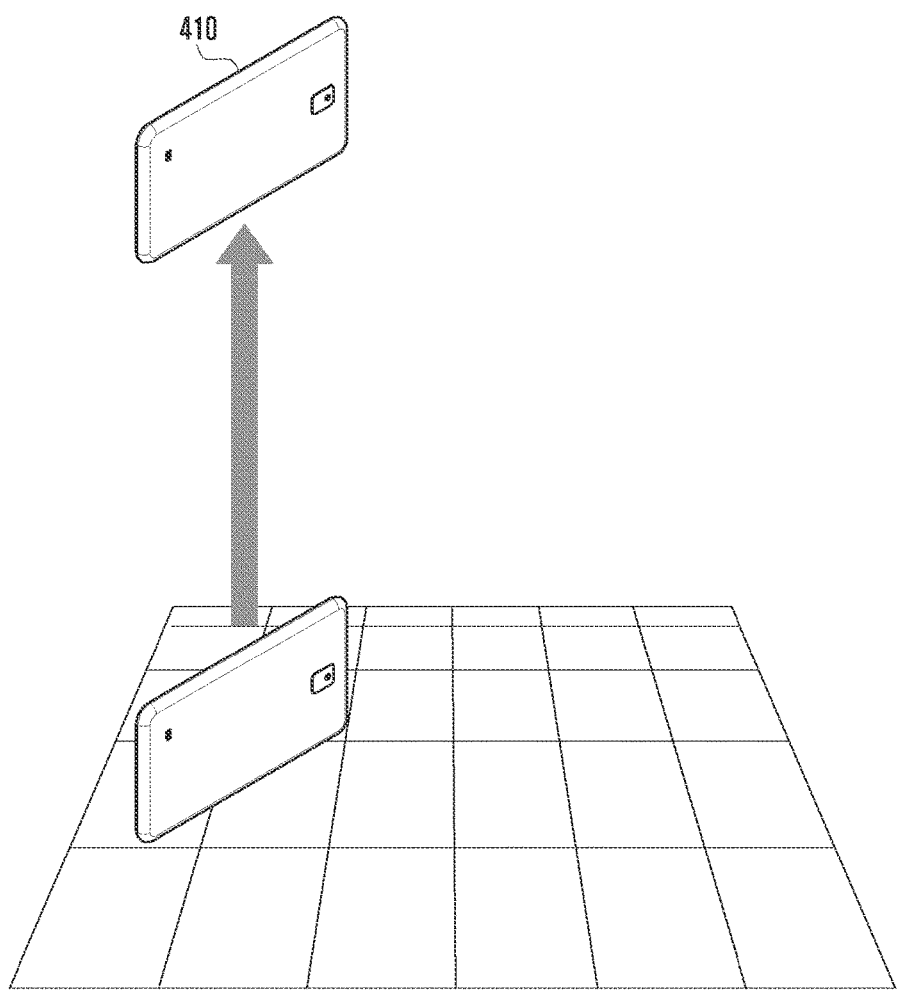
FIGS. 4A and 4B illustrate sensor calibration according to an embodiment of the present disclosure.

FIG. 4A illustrates sensor calibration according to an embodiment of the present disclosure.

Referring to FIG. 4A, when the user raises the electronic device 410 from the ground (reference plane) to a desired height, the acceleration sensor may sense the height of the electronic device 410 from the ground.

Figure 4B:
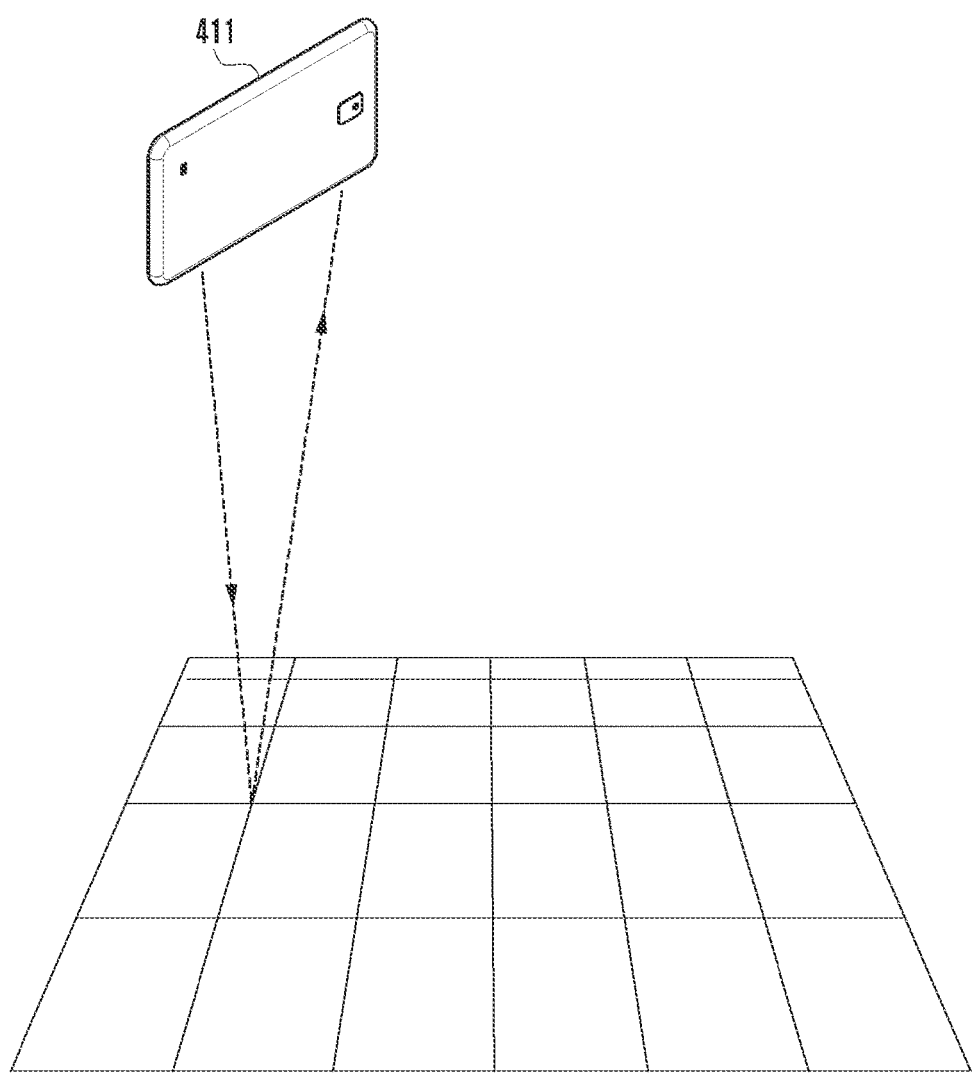

FIG. 4B illustrates sensor calibration according to an embodiment of the present disclosure.

Referring to FIG. 4B, calibration is performed using the proximity sensor rather than the acceleration sensor. When the electronic device 411 is fixed by the user at a desired height, the proximity sensor may measure the distance between the electronic device 411 and the ground.

Figure 5A:
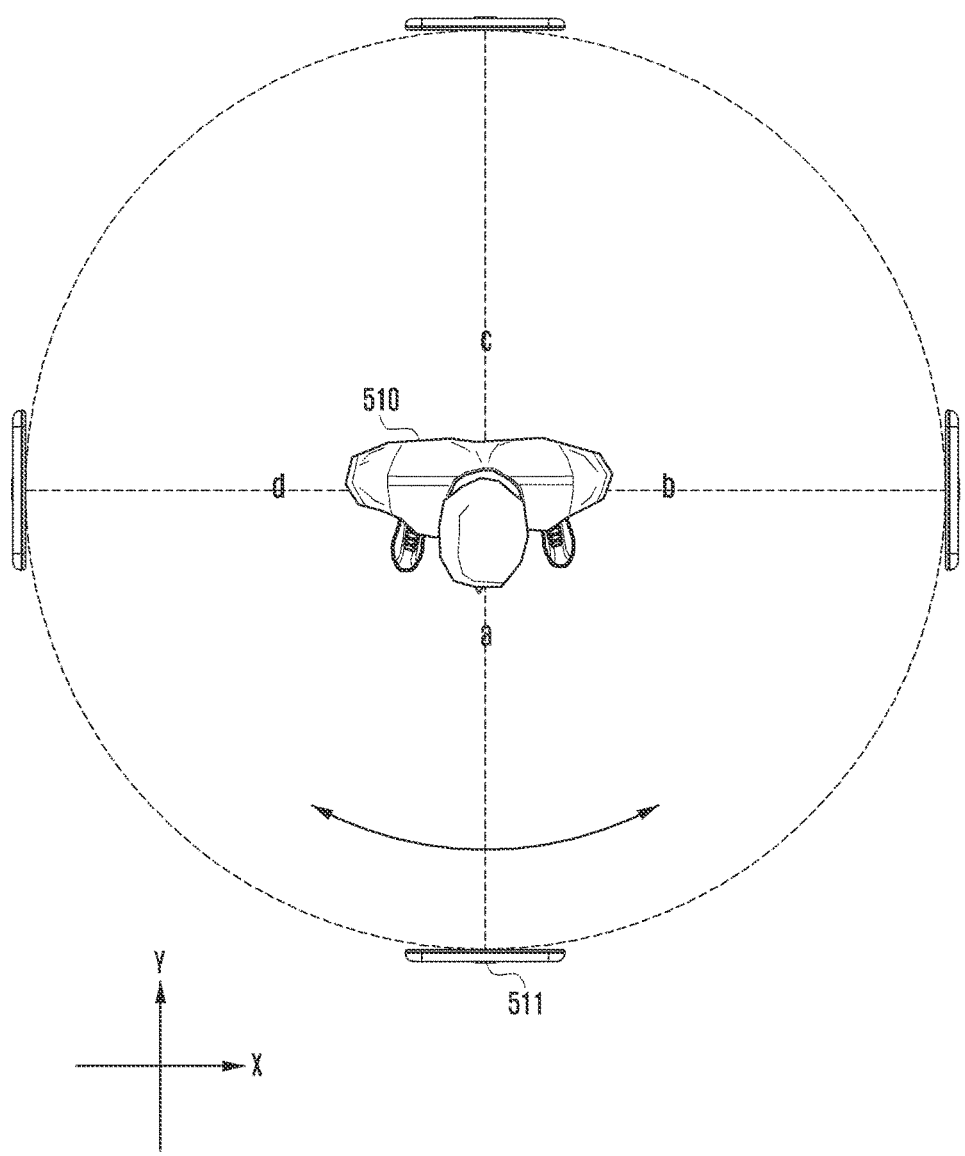
FIGS. 5A and 5B illustrate acquisition of position information for 3D modeling according to an embodiment of the present disclosure.

FIG. 5A is a top view depicting a scheme for obtaining position information for 3D modeling according to an embodiment of the present disclosure.

Referring to FIG. 5A, in consideration of the angle between the electronic device 511 and target object 510 relative to the start position of image capture, a minimum number of target object images used for 3D modeling may be obtained without duplicate or unnecessary images.

To this end, the electronic device 511 may sense the angle between the electronic device 511 and target object 510 relative to the start position of image capture and notify the user of the sensed angle.

Here, the angle between the electronic device and target object may be determined according to the number of target object images used for 3D modeling. For example, when front, rear, left and right images of a target object are used for 3D modeling, as the number of target object images used for 3D modeling is four, the electronic device may be operated to sense the angle at a step of 90 degrees from the start position.

As another example, when the target object 510 is a person, front and rear images may suffice. In this case, as the number of target object images used for 3D modeling is two, the electronic device 511 may be operated to sense the angle at a step of 180 degrees from the start position.

In FIG. 5A, to generate images for 3D modeling from the front (a) of the target object 510, the electronic device 511 may sense the angle between the electronic device 511 and the target object 510 in sequence in the direction of the front (a), the left (b), the rear (c) and the right (d) of the target object 510 (at a step of 90 degrees), or in sequence in the direction of the front (a), the right (d), the rear (c) and the left (b) of the target object 510.

The electronic device 511 does not have to start image generation for 3D modeling from the front (a) of the target object 510. For example, the electronic device 511 may sense the angle between the electronic device 511 and the target object 510 at a step of 90 degrees from the start position of image capture, or may sense angles of 90, 180 and 270 degrees regardless of the start position of image capture and notify the user of the sensed angle.

When a target object image not matching a preset angle between the electronic device 511 and the target object 510 is generated, the electronic device 511 may delete the generated target object image or stop image generation for 3D modeling.

Figure 5B:
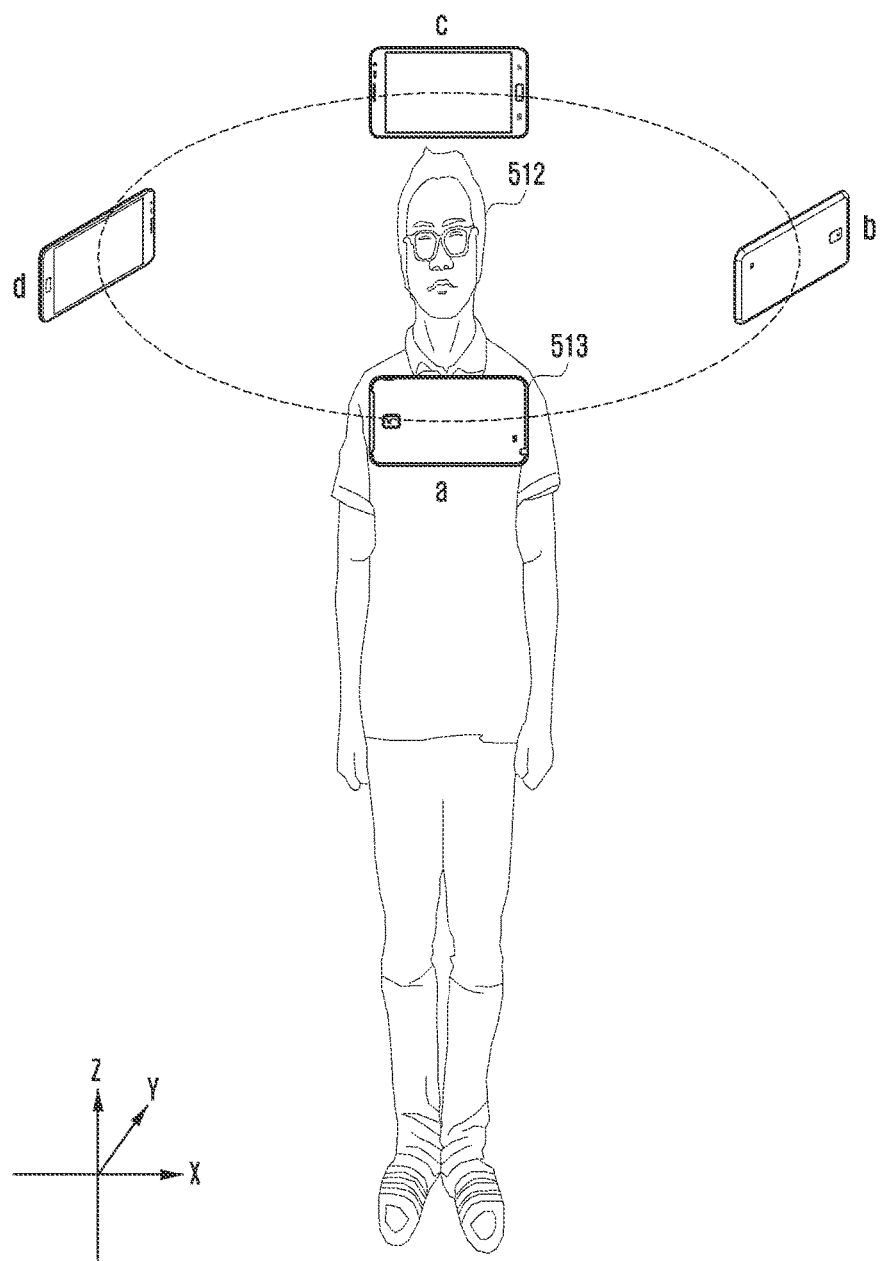

FIG. 5B is a front view depicting a scheme for obtaining position information for 3D modeling according to an embodiment of the present disclosure.

Referring to FIG. 5B, to generate a minimum number of target object images used for 3D modeling without duplicate or unnecessary images, the electronic device 513 may sense the angle between the electronic device 513 and target object 512 relative to the start position of image capture and notify the user of the sensed angle.

In FIG. 5B, to generate images for 3D modeling from the front (a) of the target object 512, the electronic device 513 may sense the angle between the electronic device 513 and the target object 512 in sequence in the direction of the front (a), the left (b), the rear (c) and the right (d) of the target object 512 (at a step of 90 degrees), or in sequence in the direction of the front (a), the right (d), the rear (c) and the left (b) of the target object 512.

The electronic device 513 does not have to start image generation for 3D modeling from the front (a) of the target object 512. For example, the electronic device 513 may sense the angle between the electronic device 513 and the target object 512 at a step of 90 degrees from the start position of image capture, or may sense angles of 90, 180 and 270 degrees regardless of the start position of image capture and notify the user of the sensed angle.

When a target object image not matching a preset angle between the electronic device 513 and the target object 512 is generated, the electronic device 513 may delete the generated target object image or stop image generation for 3D modeling.

FIGS. 6A, 6B, 6C, and 6D illustrate acquisition of image information for 3D modeling according to an embodiment of the present disclosure.

Figure 6A:
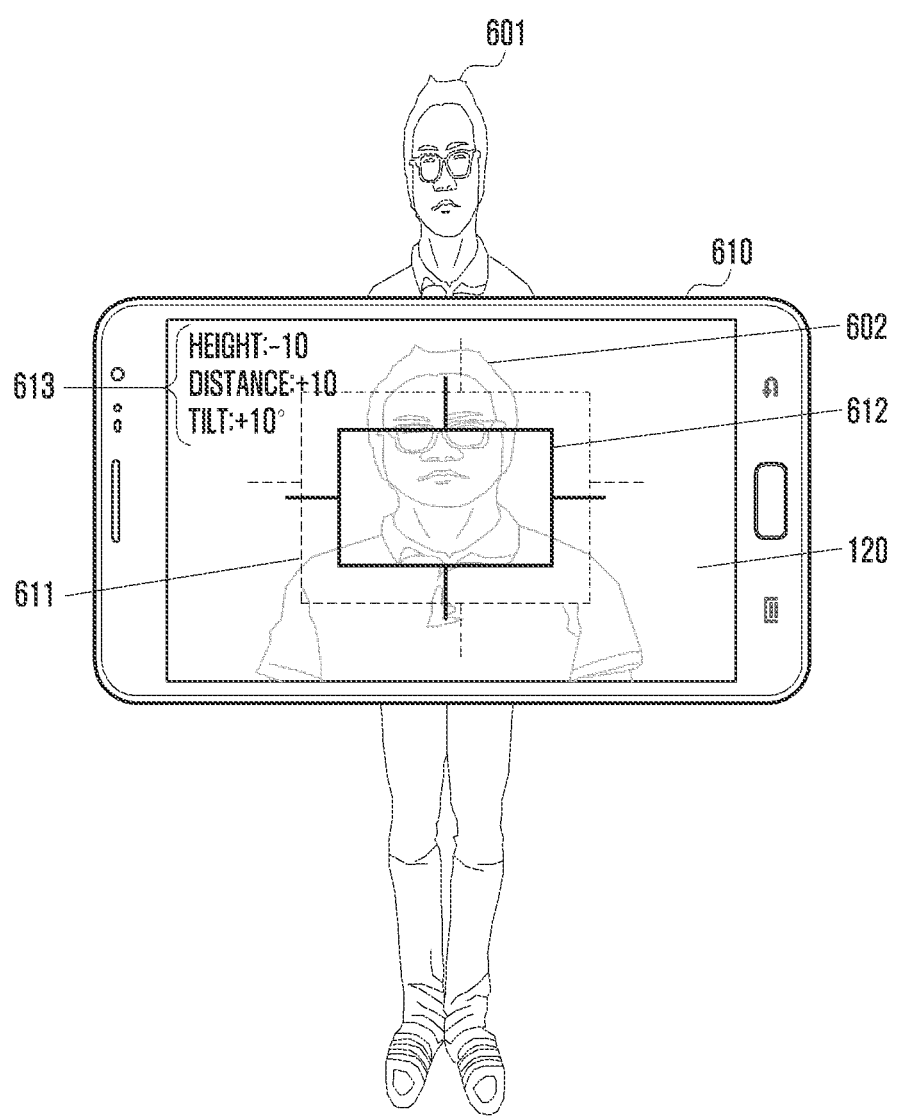
FIGS. 6A, 6B, 6C, and 6D illustrate acquisition of image and position information for 3D modeling according to an embodiment of the present disclosure.

Referring to FIG. 6A, the electronic device 610 obtains image information 602 of the target object 601 through the camera module 130 and notifies the user of position information optimized for image capture for 3D modeling on the basis of position information obtained through the sensor unit 140.

As shown in FIG. 6A, the electronic device 610 may display a guide region 611 of a reticle shape and an action region 612 on the touchscreen 120. FIG. 6A is related to a front image of the target object 601.

The x-axis line segment of the guide region 611 indicates the height of the electronic device 610, the y-axis line segment thereof indicates the angle between the electronic device 610 and target object 601 relative to the start position of image capture, and the area thereof indicates the distance between the electronic device 610 and target object 601. The tilt of the electronic device 610 is represented by the color of line segments constituting the action region 612. Here, display of position information related to the angle and distance may be omitted at the start position of image generation for 3D modeling. The electronic device 610 may display position information as character strings in a designated region 613 of the touchscreen 120.

For example, referring to FIG. 6A, when the electronic device 610 is placed below the calibrated height, the x-axis line segment of the action region 612 may be displayed below the x-axis line segment of the guide region 611.

When the angle between the electronic device 610 and the target object 601 is small, the y-axis line segment of the action region 612 may be displayed on the left side of the y-axis line segment of the guide region 611.

When the distance between the electronic device 610 and target object 601 is less than that at the start position of image generation for 3D modeling, the action region 612 may be displayed within the guide region 611 (the area of the action region 612 is smaller than that of the guide region 611).

When the tilt of the electronic device 610 is larger than that at the start position of image generation for 3D modeling, the line segments constituting the action region 612 may be displayed in a red color. In one embodiment, information on the tilt of the electronic device 610 may be output as a sound effect or notification through the speaker SPK of the audio processing unit 170.

In FIG. 6A, when the electronic device 610 is placed below the calibrated height, the x-axis line segment of the action region 612 may be displayed below the x-axis line segment of the guide region 611.

When the angle between the electronic device 610 and the target object 601 is small, the y-axis line segment of the action region 612 may be displayed on the left side of the y-axis line segment of the guide region 611.

When the distance between the electronic device 610 and target object 601 is less than that at the start position of image generation for 3D modeling, the action region 612 may be displayed within the guide region 611.

The user may identify optimal position information by placing the electronic device 610 so that the action region 612 is matched with the guide region 611.

Figure 6B:
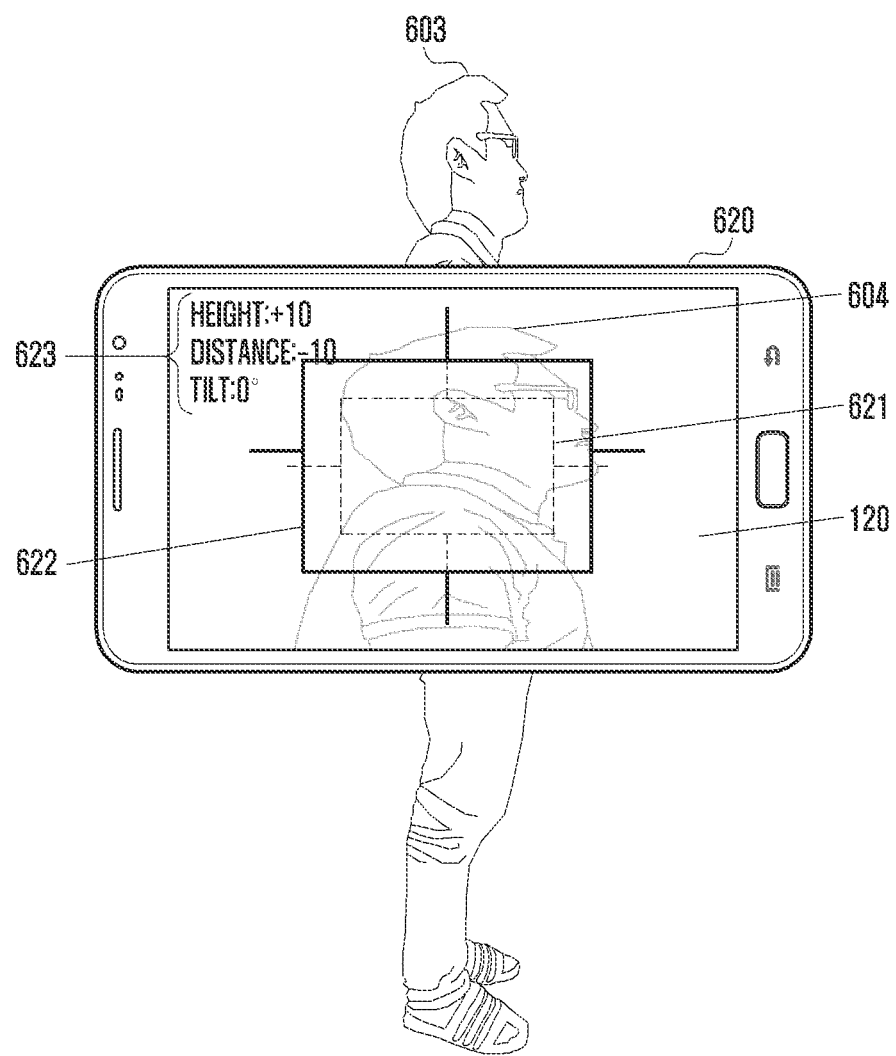

FIG. 6B is related to a right image of the target object 603.

Referring to FIG. 6B, the electronic device 620 obtains image information 604 of the target object 603 through the camera module 130 and notifies the user of position information optimized for image capture for 3D modeling on the basis of position information obtained through the sensor unit 140.

The x-axis line segment of the guide region 621 indicates the height of the electronic device 620, the y-axis line segment thereof indicates the angle between the electronic device 620 and target object 603 relative to the start position of image capture, and the area thereof indicates the distance between the electronic device 620 and target object 603. The tilt of the electronic device 620 is represented by the color of line segments constituting the action region 622. Here, display of position information related to the angle and distance may be omitted at the start position of image generation for 3D modeling. The electronic device 620 may display position information as character strings in a designated region 623 of the touchscreen 120.

For example, in FIG. 6B, when the electronic device 620 is placed above the calibrated height, the x-axis line segment of the action region 622 may be displayed above the x-axis line segment of the guide region 621.

When the angle between the electronic device 620 and the target object 603 is large, the y-axis line segment of the action region 622 may be displayed on the right side of the y-axis line segment of the guide region 621.

When the distance between the electronic device 620 and target object 603 is greater than that at the start position of image generation for 3D modeling, the action region 622 may be displayed outside the guide region 621 (the area of the action region 622 is larger than that of the guide region 621). In other words, when the distance between the electronic device 620 and target object 603 is greater than that at the start position of image generation, the guide region 621 may be displayed within the action region 622.

When the tilt of the electronic device 620 is the same as that at the start position of image generation for 3D modeling, the line segments constituting the action region 622 may be displayed in a green color.

The user may identify optimal position information by placing the electronic device 620 so that the action region 622 is matched with the guide region 621.

Figure 6C:
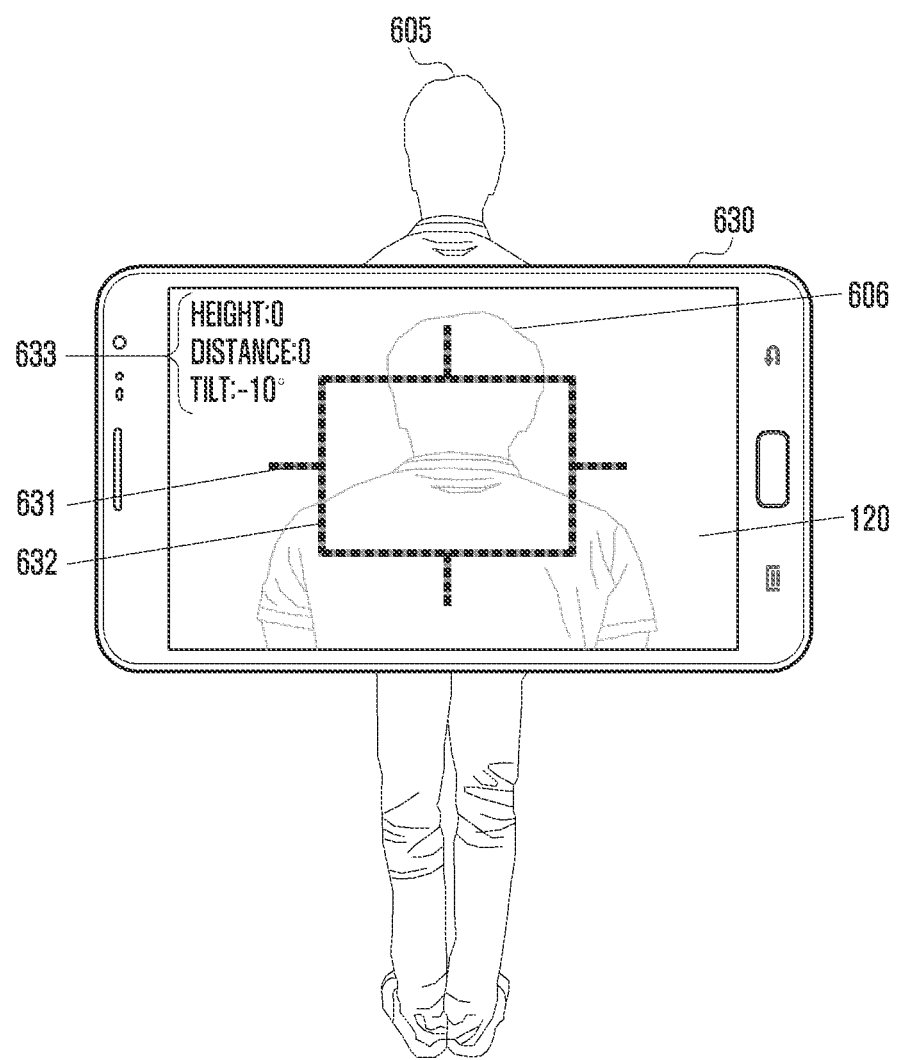

FIG. 6C is related to a rear image of the target object 605.

Referring to FIG. 6C, the electronic device 630 obtains image information 606 of the target object 605 through the camera module 130 and notifies the user of position information optimized for image capture for 3D modeling on the basis of position information obtained through the sensor unit 140.

The x-axis line segment of the guide region 631 indicates the height of the electronic device 630, the y-axis line segment thereof indicates the angle between the electronic device 630 and target object 605 relative to the start position of image capture, and the area thereof indicates the distance between the electronic device 630 and target object 605. The tilt of the electronic device 630 is represented by the color of line segments constituting the action region 632. Here, display of position information related to the angle and distance may be omitted at the start position of image generation for 3D modeling. The electronic device 630 may display position information as character strings in a designated region 633 of the touchscreen 120.

For example, in FIG. 6C, when the electronic device 630 is placed at the calibrated height, the x-axis line segment of the action region 632 may be displayed so as to coincide with the x-axis line segment of the guide region 631.

When the angle between the electronic device 630 and the target object 605 matches a preset value, the y-axis line segment of the action region 632 may be displayed so as to coincide with the y-axis line segment of the guide region 631.

When the distance between the electronic device 630 and target object 605 is the same as that at the start position of image generation for 3D modeling, the action region 632 may be displayed so as to coincide with the guide region 631 (the area of the action region 632 is the same as that of the guide region 631).

When the tilt of the electronic device 630 is larger than that at the start position of image generation for 3D modeling, the line segments constituting the action region 632 may be displayed in a red color. The user may identify optimal position information by placing the electronic device 630 so that the action region 632 matches the guide region 631.

Figure 6D:
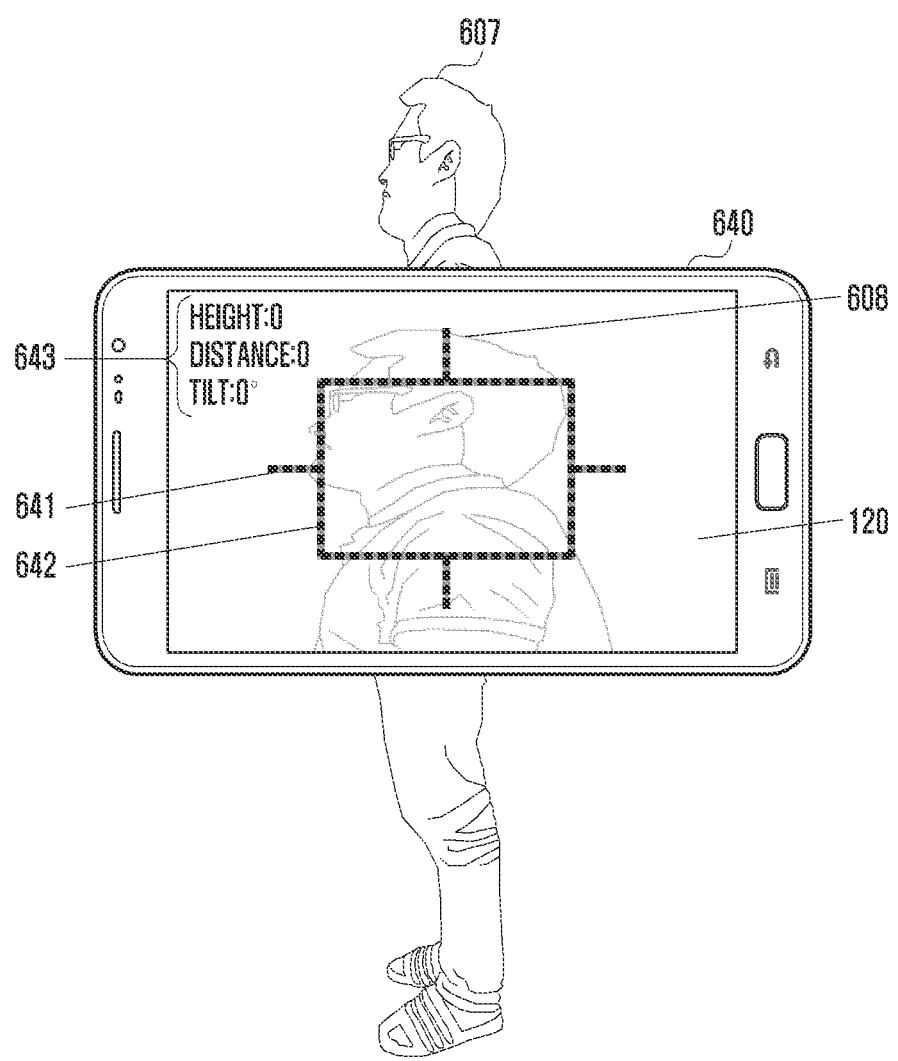

FIG. 6D is related to a left image of the target object 607.

Referring to FIG. 6D, the electronic device 640 obtains image information 608 of the target object 607 through the camera module 130 and notifies the user of position information optimized for image capture for 3D modeling on the basis of position information obtained through the sensor unit 140.

The x-axis line segment of the guide region 641 indicates the height of the electronic device 640, the y-axis line segment thereof indicates the angle between the electronic device 640 and target object 607 relative to the start position of image capture, and the area thereof indicates the distance between the electronic device 640 and target object 607. The tilt of the electronic device 640 is represented by the color of line segments constituting the action region 642. Here, display of position information related to the angle and distance may be omitted at the start position of image generation for 3D modeling. The electronic device 640 may display position information as character strings in a designated region 643 of the touchscreen 120.

For example, in FIG. 6D, when the electronic device 630 is placed at the calibrated height, the x-axis line segment of the action region 642 may be displayed so as to coincide with the x-axis line segment of the guide region 641.

When the angle between the electronic device 640 and the target object 607 matches a preset value, the y-axis line segment of the action region 642 may be displayed so as to coincide with the y-axis line segment of the guide region 641.

When the distance between the electronic device 640 and target object 607 is the same as that at the start position of image generation for 3D modeling, the action region 642 may be displayed so as to coincide with the guide region 641 (the area of the action region 642 is the same as that of the guide region 641).

When the tilt of the electronic device 640 is the same as that at the start position of image generation for 3D modeling, the line segments constituting the action region 642 may be displayed in a green color.

The user may obtain image information 608 of the target object 607 using the camera module 130 when the action region 642 matches the guide region 641.

When an image of the target object is captured by the camera module 130, the control unit 110 may store the target object image together with the position information, in such a way that the position information may be used as metadata of the target object image, as an image file in the storage unit 160, and may send the image file to a specific server through the communication unit 150. Alternatively, the control unit 110 may separately store the position information and the target object image in the storage unit 160, and may separately send the same to a specific server through the communication unit 150.

Figure 7:
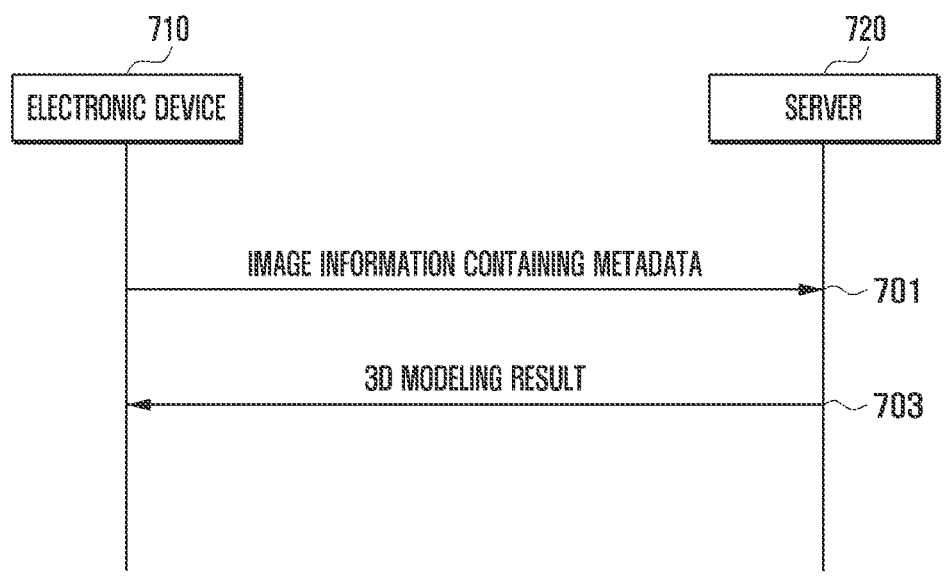
FIG. 7 is a sequence diagram illustrating signal flows between devices for 3D image generation according to an embodiment of the present disclosure.

FIG. 7 is a sequence diagram illustrating signal flows between devices for 3D image generation according to an embodiment of the present disclosure.

Referring to FIG. 7, at operation 701, the electronic device 710 sends an image file for 3D modeling to an external server 720. Here, the image file contains image data of a target object and position information of the electronic device 710 and the target object as metadata. The external server 720 performs 3D modeling using the received image file. At operation 703, the external server 720 sends the 3D modeling result (i.e., 3D image) to the electronic device 710.

As described above, embodiments of the present disclosure may be provided in a form of program commands executable through various computer means and recorded in a non-transitory recording media readable by a computer. Here, the non-transitory recording media readable by a computer may include a program command, data file, data structure, and any combination thereof. In the meantime, the program command recorded in the non-transitory recording media may be one specially designed for the embodiments of the present disclosure or one disclosed in the art of computer software. The non-transitory recording media readable by a computer may include hardware devices specially designed to store and execute programs such as magnetic media (hard disk, floppy disk, and magnetic tape), optical media (Compact Disc-Read Only Memory (CD-ROM) and Digital Versatile Disc (DVD)), magneto-optical media (floptical disk), Read Only Memory (ROM), Random Access Memory (RAM), and flash memory. Further, the program command may include a high level language code executable by a computer having an interpreter as well as a machine language code provided by a complier. The hardware device may be configured with at least one software module to perform operations according to various embodiments of the present disclosure.

While the present disclosure has been shown and described with reference to various embodiments thereof, it will be understood by those skilled in the art that various changes in form and details may be made therein without departing from the spirit and scope of the present disclosure as defined in the appended claims and their equivalents.

What is claimed is:

1. A shooting method for three dimensional modeling in an electronic device having at least one sensor for sensing position information and an image sensor for image capture, the shooting method comprising:
    calibrating the at least one sensor;
    obtaining position information used for the three dimensional modeling using the at least one sensor;
    identifying a least number of required images to be used for the three dimensional modeling of a target object;
    displaying a guide including a field of view of the image sensor and indicating an optimized position information of the image sensor for capturing an image based on the obtained position information and the least number of required images, wherein the optimized position information includes height information of the electronic device, relative angle information between the electronic device and the target object, and relative distance information between the electronic device and the target object;
    capturing multiple images according to the least number of required images of the target object based on the displayed guide; and
    storing the position information as metadata of each captured image.

2. The shooting method of claim 1, wherein the position information comprises at least one of information on a height of the electronic device, information on a tilt of the electronic device, information on a distance between the electronic device and the target object, and information on an angle between the electronic device and the target object relative to a start position of image capture.

3. The shooting method of claim 2, wherein the calibrating of the at least one sensor comprises measuring the height of the electronic device placed at a height set by a user.

4. The shooting method of claim 2, wherein the obtaining of the position information comprises measuring the height and tilt of the electronic device through the at least one sensor and computing the distance between the electronic device and the target object using the measured height and tilt.

5. The shooting method of claim 1, wherein, in the capturing of the multiple images, image capture and acquisition of the position information are simultaneously performed.

6. The shooting method of claim 1, further comprising generating information usable to correct the position of the electronic device for image capture on the basis of the position information.

7. The shooting method of claim 1, wherein the storing of the position information comprises storing each captured image together with associated position information as a separate image file.

8. The shooting method of claim 7, further comprising:
sending, by the electronic device, multiple image files related to the target object to an external server;
generating, by the external server, a three dimensional image of the target object using the multiple image files; and
sending, by the external server, the three dimensional image to the electronic device.

9. The shooting method of claim 2, wherein the angle between the electronic device and the target object relative to the start position of image capture is changed according to information on the target object images used for three dimensional modeling.

10. The shooting method of claim 2, wherein the at least one sensor comprises at least one of a gyro sensor, an acceleration sensor, and a proximity sensor.

11. An electronic device supporting a shooting method for three dimensional modeling, the electronic device comprising:
at least one sensor configured to sense position information;
an image sensor configured to capture images used for the three dimensional modeling;
a touchscreen configured to display information used for the three dimensional modeling; and
at least one processor configured to:
calibrate the at least one sensor,
obtain the position information used for the three dimensional modeling using the at least one sensor,
identify a least number of required images to be used for the three dimensional modeling of a target object,
control the touchscreen to display a guide including a field of view of the image sensor and indicating an optimized position information of the image sensor for capturing an image based on the obtained position information and the least number of required images, wherein the optimized position information includes height information of the electronic device, relative angle information between the electronic device and the target object, and relative distance information between the electronic device and the target object,
capture multiple images according to the least number of required images of the target object based on the displayed guide, and
store the position information and the optimized position information as metadata of each captured image.

12. The electronic device of claim 11, wherein the position information comprises at least one of information on a height of the electronic device, information on a tilt of the electronic device, information on a distance between the electronic device and the target object, and information on an angle between the electronic device and the target object relative to a start position of image capture.

13. The electronic device of claim 12, wherein the at least one processor is further configured to calibrate the at least one sensor by controlling the at least one sensor to measure the height of the electronic device placed at a height set by a user.

14. The electronic device of claim 12, wherein the at least one processor is further configured to:
measure the height and tilt of the electronic device through the at least one sensor, and
compute the distance between the electronic device and the target object using the measured height and tilt.

15. The electronic device of claim 11, wherein the at least one processor is further configured to capture multiple images by simultaneously performing image capture and acquisition of the position information.

16. The electronic device of claim 11, wherein the at least one processor is further configured to:
generate information usable to correct the position of the electronic device for image capture on the basis of the position information, and
output the generated information on the touchscreen.

17. The electronic device of claim 11, further comprising a memory configured to store each captured image together with associated position information as a separate image file.

18. The electronic device of claim 17, further comprising a communication unit configured to:
send multiple image files related to the target object to an external server, and
receive a three dimensional image for the target object as a result of three dimensional modeling from the external server.

19. The electronic device of claim 12, wherein the at least one processor is further configured to change the angle between the electronic device and the target object relative to the start position of image capture according to information on target object images used for three dimensional modeling.

20. The electronic device of claim 12, wherein the at least one sensor comprises at least one of a gyro sensor, an acceleration sensor, and a proximity sensor.

* * * * *